United States Patent [19]
Katsumata

[11] Patent Number: 6,038,608
[45] Date of Patent: Mar. 14, 2000

[54] VIRTUAL LAN SYSTEM

[75] Inventor: Kenichi Katsumata, Tokyo, Japan

[73] Assignee: NEC Corporation, Tokyo, Japan

[21] Appl. No.: 08/978,385

[22] Filed: Nov. 25, 1997

[30] Foreign Application Priority Data

Nov. 25, 1996 [JP] Japan ................................. 8-313311

[51] Int. Cl.[7] ........................................................ G06F 13/00
[52] U.S. Cl. ........................ 709/238; 709/238; 709/249; 709/218; 370/522; 370/908; 370/401; 370/402; 370/407
[58] Field of Search .................................. 370/522, 908, 370/401, 402, 407, 94.1, 94.3; 709/218, 227, 249, 238

[56] References Cited

U.S. PATENT DOCUMENTS

| | | | |
|---|---|---|---|
| 3,767,794 | 10/1973 | McVean et al. | 424/21 |
| 4,127,650 | 11/1978 | Buehler | 424/184 |
| 4,198,390 | 4/1980 | Rider | 424/21 |
| 4,316,888 | 2/1982 | Nelson | 424/127 |
| 4,396,604 | 8/1983 | Mitra | 424/154 |
| 4,639,368 | 1/1987 | Niazi et al. | 424/48 |
| 4,823,338 | 4/1989 | Chan et al. | 370/522 |
| 4,857,324 | 8/1989 | Mir et al. | 424/690 |
| 5,073,384 | 12/1991 | Valentine et al. | 424/474 |
| 5,075,114 | 12/1991 | Roche | 424/470 |
| 5,169,640 | 12/1992 | France et al. | 424/470 |
| 5,204,118 | 4/1993 | Goldman et al. | 424/489 |
| 5,229,137 | 7/1993 | Wolfe | 424/687 |
| 5,248,505 | 9/1993 | Garwin | 424/472 |
| 5,260,072 | 11/1993 | Roche et al. | 424/464 |
| 5,394,402 | 2/1995 | Ross | 370/402 |

FOREIGN PATENT DOCUMENTS

| | | |
|---|---|---|
| 1 042 796 | 11/1978 | Canada . |
| 1 139 221 | 1/1983 | Canada . |
| 0 294 933 A2 | 12/1988 | European Pat. Off. . |
| 0 428 296 | 5/1991 | European Pat. Off. . |
| 0 439 315 A1 | 7/1991 | European Pat. Off. . |
| 0 600 725 A1 | 6/1994 | European Pat. Off. . |
| 1038 | of 1962 | France . |
| 2 557 429 | 7/1985 | France . |
| 63-33945 | 2/1988 | Japan . |
| 63-146536 | 6/1988 | Japan . |
| 63-193742 | 8/1988 | Japan . |
| 64-54954 | 3/1989 | Japan . |
| 1-229542 | 9/1989 | Japan . |
| 1-254034 | 10/1989 | Japan . |
| 3-89645 | 4/1991 | Japan . |
| 3-276943 | 12/1991 | Japan . |
| 4-341033 | 11/1992 | Japan . |

OTHER PUBLICATIONS

J. Alfred Rider, An Improved Simethicone Antacid Tablet, pp. 1033–1038 (1981).

F. Maksoud, S.A. Said and M. Gourab, "Simethicone Use in Antacid Medications", pp. 35 and 36 (1976).

J.K. Lalla and M.A. Sarkar, Preparation and Stability Testing of Simethicone Emulsion, pp. 159–166 (1985).

Cellulose Esters Polymer Characterization, Bulleltin CE–2, FMC Corp. (1987).

Cellulose Esters Polymers for Novel Drug Delivery, Bulletin CE–1, FMC Corp. (1986).

CA115(24):263465f, Pharmaceutical Composition for Treating Gastrointestinal Distress (1991).

CA111(2):12462a, Incorporation of Simethicone into Syrupy or Clear Base Liquid Orals (1989).

(List continued on next page.)

*Primary Examiner*—Dung C. Dinh
*Assistant Examiner*—Hieu C. Le
*Attorney, Agent, or Firm*—Scully, Scott Murphy & Presser

[57] ABSTRACT

By providing a plurality of virtual LAN's such that ports communicating according to one protocol are grouped and communication is performed between the ports in the group, a communication is possible according to a plurality of protocols and it is possible to enter into other virtual LAN's than a virtual LAN to which a connection is made.

9 Claims, 2 Drawing Sheets

OTHER PUBLICATIONS

CA97(13):103890x, The Effect of Activated Dimethicone and an Proprietary Antacid Preparation Containing this Agent on the Absorption of Phenytoin (1982).

CA96(25):210465p, The Effect of Activated Dimethicone, Other Antacid Constituents, and Kaolin on the Absorption of Propranolol (1982).

CA93(14):138018p, Uniform Beadlike Particles Forming a Powder Surpuriya (1980).

CA90(17):132533u, Interaction of Digoxin with Activated Dimethicone and Other Antacid Constituents (1979).

CA107(4):28386g, Drugs in Combined Gastro–Soluble and Gastro–Resistant Form (1986).

C71–s36634, Flatulence Treatment with Antifoaming—Compn (1974).

C75–W80496, Medicaments for Treating Nervous Hyperacidity, Etc.—Contg. a Psychosedative, an Antacid, and an Antiflatuent (1975).

1 : Corresponding Port Belongs to Virtual LAN

0 : Corresponding Port does not Belong to Virtual LAN

VIRTUAL LAN SYSTEM

BACKGROUND OF THE INVENTION

1. Field of the Invention

The present invention relates to a virtual LAN system and, particularly, to a virtual LAN system in which a virtual LAN is constructed every protocol.

2. Description of Related Art

In order to construct a plurality of virtual LAN's every protocol indicative of communication procedures in a virtual LAN system of this kind, it has been usual, as disclosed in Japanese Patent Application Laid-open No. Sho 64-54954, to determine a protocol higher in level than a network layer of OSI reference model used in a communication every LAN (referred to as "upper protocol", hereinafter) such that a communication is possible in a LAN according to only the determined protocol.

The term "virtual LAN" in this description means a LAN which services a host terminal by connecting the host terminal to the LAN through not a physical port of the host terminal but a logical connection.

Further, in order to enable the host terminal to belong to a plurality of virtual LAN's, virtual LAN's to which the host terminal can belong are preliminarily registered in a virtual server for controlling the construction of the virtual LAN's and a connection is made to the virtual LAN server by assigning the virtual LAN to be used in a communication when the host terminal starts the communication.

Since such conventional virtual LAN system determines the upper protocol to be used in a communication every LAN in order to construct a plurality of virtual LAN's every protocol indicative of the communication procedures, a communication within the LAN must be performed by using only this protocol. Therefore, there is a problem that the host terminal can not perform communication by using a plurality of upper protocols within the connected LAN. Further, since, in order to enable the host terminal to belong to a plurality of virtual LAN's, virtual LAN's to which the host terminal can belong are preliminarily registered in a virtual server for controlling the construction of the virtual LAN's and a connection is made to the virtual LAN server by assigning the virtual LAN to be used in a communication when the host terminal starts the communication, there is another problem that can not use other virtual LAN's than the virtual LAN to which the connection is made.

SUMMARY OF THE INVENTION

An object of the present invention is to provide a virtual LAN system in which a host terminal can perform communication by using a plurality of upper protocols within a LAN to which the host terminal is connected and can use other virtual LAN's than a virtual LAN to which a connection is made.

In the virtual LAN system according to the present invention, a plurality of virtual LAN's are provided in each of which a communication is performed between ports in a port group including a plurality of ports which communicate with each other by using the same protocol.

Further, the virtual LAN system according to the present invention which uses an intelligent switching hub device including a plurality of ports and a frame switch for outputting a frame to one of the ports according to a destination MAC (Media Access Control) address indicative of the one port as a destination and contained in the frame received by one of the ports, is featured by that the frame switch comprises a port table having pointers A indicative of next tables corresponding to the respective ports, a plurality of protocol ID tables produced correspondingly to the pointers A of the respective port tables and having pointers B indicative of respective next tables corresponding in number to protocols which can be communicated with the ports corresponding to the respective pointers A, a plurality of virtual LAN data tables produced for respective virtual LAN's preliminarily determined in the frame switch and having pointers C indicative of respective next tables appointed by the pointers B in the protocol ID tables and a port information indicative of the ports belonging to the respective virtual LAN's and a plurality of MAC forwarding tables produced correspondingly to the respective pointers C in the virtual LAN data tables and having port numbers of the ports corresponding to the respective pointers A and produced correspondingly to transmitting MAC addresses contained in the frame received by the ports corresponding to the pointers A in the port tables and indicative of transmitters and a count value of a counter for continuously counting from a time at which the port numbers are registered.

Further, the virtual LAN system according to the present invention which uses an intelligent switching hub device including a plurality of ports and a frame switch for outputting a frame to one of the ports according to a destination MAC address indicative of the one port as a destination and contained in the frame received by one of the ports, is featured by that the frame switch receives the frame at one of the ports, searches the pointer A from the port table according to the number of the port which received the frame, searches the pointer B from the protocol ID table indicated by the pointer A according to a protocol ID indicative of the kind of protocol contained in the received frame and used in the frame communication, extracts the pointer C from the virtual LAN data table indicated by the pointer B, searches the MAC forwarding table indicated by the pointer C according to the transmitting MAC address contained in the received frame and, when there is a constructive component of the MAC forwarding table corresponding to the transmitting MAC address, sets the port number of the received frame to the port number of the constructive component and resets the count value of the timer of the constructive component, newly registers the port number in the MAC forwarding table correspondingly to the transmitting MAC address when there is no constructive component, searches the MAC forwarding table indicated by the pointer C using the destination MAC address contained in the frame and, when there is a constructive component of the MAC forwarding table corresponding to the destination MAC address, sends the received frame to the port indicated by the port number of the searched constructive component, and sends the received frame to all of the ports indicated by the port numbers which can communicate by the virtual LAN indicated by the port information in the virtual LAN table having the pointers C indicated by the MAC forwarding table when there is no constructive component.

DETAILED DESCRIPTION OF PREFERRED EMBODIMENTS

Now, preferred embodiments of the present invention will be described with reference to the drawings.

Figure 1:
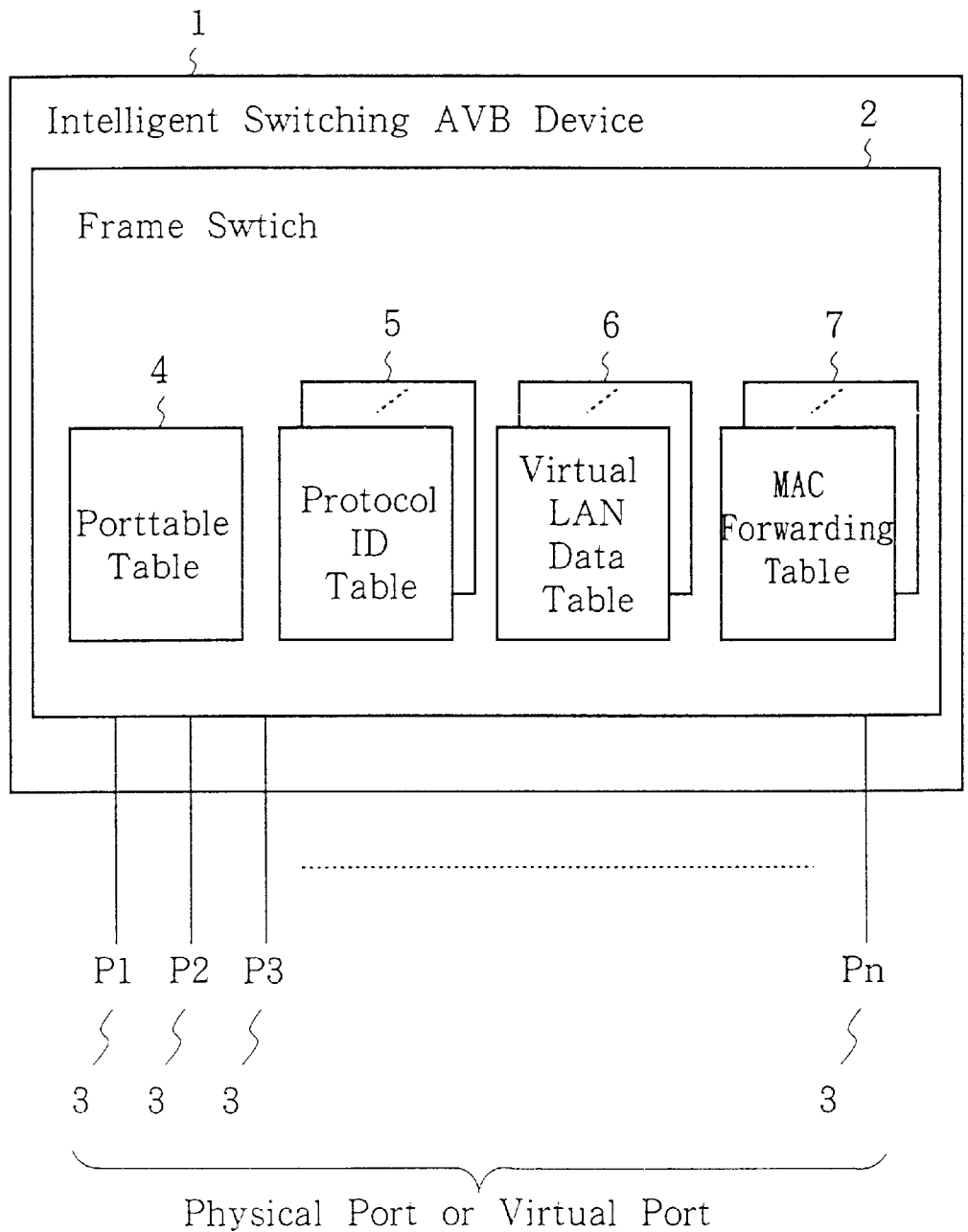
FIG. 1 is a block diagram showing an embodiment of a virtual LAN system according to the present invention.

FIG. 1 is a block diagram showing an embodiment of a virtual LAN system according to the present invention. In this embodiment, the virtual LAN system, which uses an intelligent switching hub device 1 comprising a plurality of ports 3 which include physical ports which can be physically connected or logical ports which can be logically connected and a frame switch 2 for outputting a frame 9 to one of the ports 3 according to a destination MAC (Media Access Control) address indicative of the one port as a destination and contained in the frame 9 received by one of the ports 3, is featured by that the frame switch 2 comprises a port table 4 having pointers A indicative of next tables corresponding to the respective ports 3, a plurality of protocol ID tables 5 produced correspondingly to the respective pointers A and having pointers B indicative of respective next tables, a plurality of virtual LAN data tables 6 produced for respective virtual LAN's preliminarily determined in the frame switch 2 and having pointers C indicative of respective next tables and a port information 8 indicative of the ports 3 belonging to the respective virtual LAN's and a plurality of forwarding tables 7 produced correspondingly to the respective pointers C in the virtual LAN data tables 6 and having port numbers of the ports 3 corresponding to the respective pointers A and a count value of a counter for continuously counting from a time at which the port numbers are registered. Incidentally, the MAC is a control using a MAC sub-layer among data link layers of a hierarchical model of LAN.

An operation of the virtual LAN system according to this embodiment will be described in detail with reference to FIGS. 2, 3 and 4.

Figure 2:
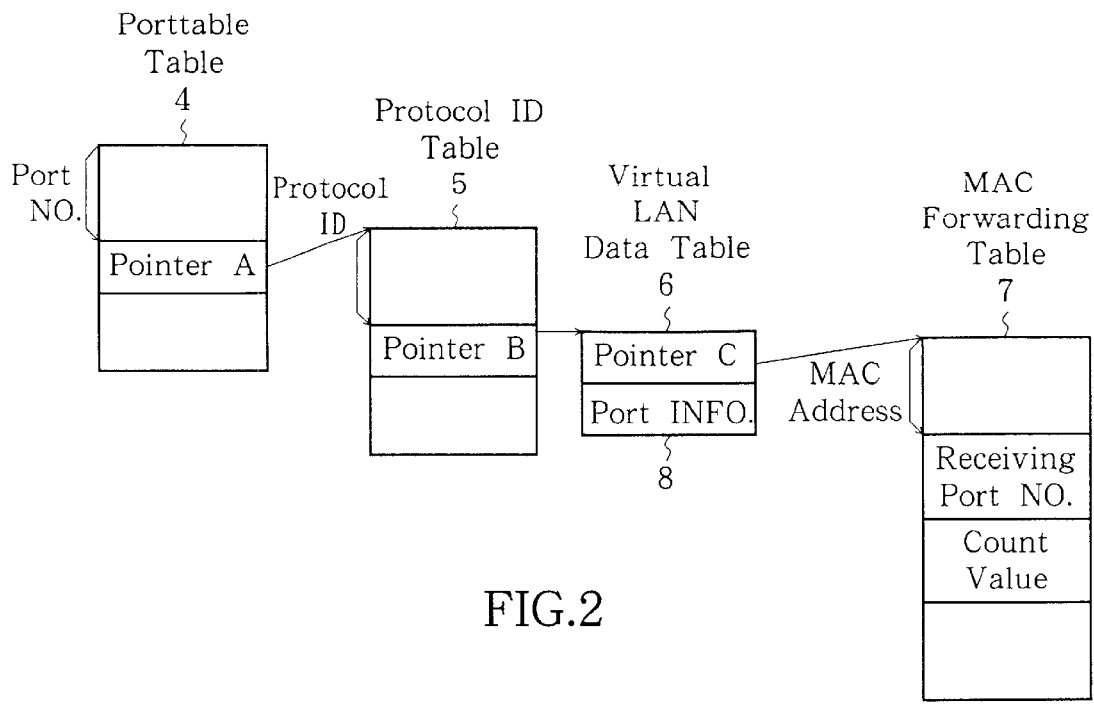
FIG. 2 shows a construction of a frame switch.

FIG. 2 shows a construction of the frame switch. The frame switch 2 comprises the port table 4 having pointers A indicative of next tables corresponding to the respective ports 3, the plurality of the protocol ID tables 5 produced correspondingly to the respective pointers A and having pointers B indicative of respective next tables the number of which corresponds to the number of the protocols according to which the ports 3 corresponding to the pointers A can communicate, the plurality of the virtual LAN data tables 6 produced for respective virtual LAN's preliminarily determined in the frame switch 2 and having the pointers C indicative of respective next tables and the port information 8 indicative of the ports 3 belonging to the respective virtual LAN's and the plurality of the forwarding tables 7 produced correspondingly to the respective pointers C in the virtual LAN data tables 6 and having the port numbers of the ports 3 corresponding to the respective pointers A and the count value of the timer for continuously counting from the time at which the port numbers are registered.

Figure 3:
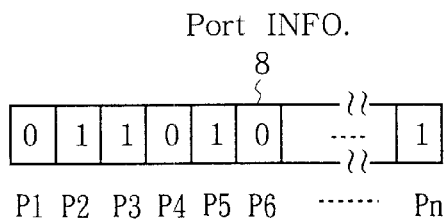
FIG. 3 shows a port information indicative of a port belonging to a virtual LAN.

FIG. 3 shows an example of the port information indicating a port belonging to the virtual LAN. The shown port information indicates that the ports P2, P3, P5 and Pn of the n ports 3 belong to the virtual LAN.

Figure 4:
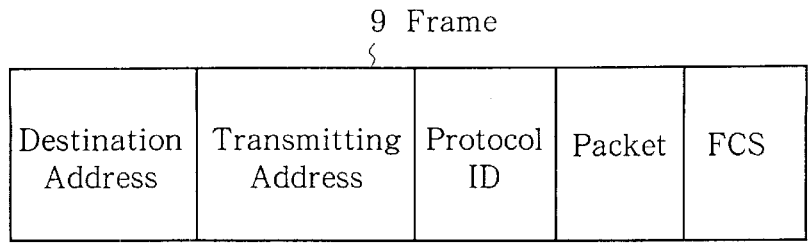
FIG. 4 shows a construction of a frame.

FIG. 4 shows an example of a construction of the frame 9 which is composed of the destination MAC address indicative of a destination of the frame 9, the transmitting MAC address indicative of a transmitter of the frame 9, the protocol ID indicative of a protocol which defines the communication procedures used in the communication of this frame 9, a packet indicative of a content of the communication using the frame 9 and FCS indicating a code for checking the frame 9.

In FIG. 1, the frame switch 2 of the intelligent switching hub device 1 receives the frame 9 at one of its ports 3 and searches the pointer A from the port table 4 according to the number of the port which received the frame 9 as shown in FIG. 2. According to the protocol ID indicative of the kind of the protocol contained in the received frame 9, used in the communication of the frame 9 and shown in FIG. 4, the pointer B is searched from the protocol ID table 5 indicated by the pointer A, as shown in FIG. 2. Then, as shown in FIG. 2, the pointer C is extracted from the virtual LAN data table 6 indicated by the pointer B and the MAC forwarding table 7 indicated by the pointer C with using the transmitting MAC address contained in the received frame 9 and shown in FIG. 4. When there is the constructive component of the MAC forwarding table 7 corresponding to the transmitting MAC address, the number of the port which received the frame 9 is set to the port number of the searched constructive component and the count value of the timer of this constructive component is reset. When there is no constructive component, the number of the port 3 is newly registered in the MAC forwarding table 7 correspondingly to the transmitting MAC address as the port number. In this case, the port number and the count value of the timer corresponding to this port number and continuing the counting from the time at which the port number is registered become the constructive components of the MAC forwarding table 7. Then, the MAC forwarding table 7 indicated by the pointer C is searched by using the destination MAC address contained in the frame 9 and shown in FIG. 4 and, when there are constructive components of the MAC forwarding table 7 corresponding to the destination MAC address, the frame 9 received at the port 3 having the port number of the searched constructive components is sent. When there is no constructive component, the received frame 9 is sent to all of the ports 3 which are indicated in the port information 8 shown in FIG. 3 and contained in the virtual LAN data table 6 having the pointer C indicating the MAC forwarding table 7 and are enabled to communicate by the virtual LAN. When the count value of the timer among other constructive components produced in the MAC forwarding table 7 correspondingly to the transmitting MAC address contained in the frame 9 received by the port 3 and indicative of the transmitter exceeds a predetermined value, the constructive component corresponding to the transmitting MAC address is deleted from the MAC forwarding table 7.

As described hereinbefore, according to the virtual LAN system of the present invention, a protocol ID table is provided every part for defining a protocol according to which the port can communicate. Therefore, a communication is possible according to a plurality of upper protocols by using a port.

Further, since a virtual LAN data table is provided which makes a virtual LAN to which the frame belongs passible to define by a protocol ID contained in a received frame, it is possible to join other virtual LAN's than a connection is provided.

Further, since, in a case where a destination MAC address in the received frame is not learnt (indicating that there is no constructive component corresponding to this MAC address registered in the MAC forwarding table), the frame is transmitted to only ports which can communicate through a virtual LAN corresponding to a protocol ID which is indicated in the port information of the virtual LAN data table and corresponds to the protocol ID in this frame. Therefore, there are only frames in the virtual LAN, which are to be communicated with according to a protocol corresponding to the virtual LAN, so that an intra-LAN communication can be performed with high transmission efficiency without unnecessary load on the virtual LAN.

I claim:

1. A virtual LAN system comprising a plurality of virtual LANs and an intelligent switching hub device with a plurality of ports for conducting protocol-based communications, wherein ports communicating according to one protocol are grouped and communication is performed between said ports in said group, wherein said virtual LAN system includes a frame switch for outputting a frame to one of said ports according to a destination MAC address indicative of said one port as a destination and contained in said frame received by said one of said ports, and wherein said frame switch comprises:

a port table having pointers A indicative of next tables corresponding to said respective ports;

a plurality of protocol ID tables produced correspondingly to said pointers A of said respective port tables and having pointers B indicative of respective next tables corresponding in number to protocols which can be communicated with said ports corresponding to said respective pointers A;

a plurality of virtual LAN data tables produced for respective virtual LAN preliminarily determined in said frame switch and having pointers C indicative of respective next tables appointed by said pointers B in said protocol ID tables and a port information indicative of said ports belonging to said respective virtual LANs; and a plurality of MAC forwarding tables produced correspondingly to said respective pointers C in said virtual LAN data tables and having port numbers of said ports corresponding to said respective pointers A and produced corresponding to transmitting MAC addresses contained in said frame received by said ports corresponding to said pointers A in said port tables and indicative of transmitters and a count value of a counter for continuously counting from a time at which said port numbers are registered.

2. A virtual LAN system as claimed in claim 1, wherein said virtual LAN system uses an intelligent switching hub device including a plurality of ports and a frame switch for outputting a frame to one of said ports according to a destination MAC address indicative of said one port as a destination and contained in said frame received by said one of said ports and wherein said frame switch receives said frame at one of said ports, searches said pointer A from said port table according to the number of said port which received said frame, searches said pointer B from said protocol ID table indicated by said pointer A according to a protocol ID indicative of the kind of protocol contained in said received frame and used in said frame communication, extracts said pointer C from said virtual LAN data table indicated by said pointer B, searches said MAC forwarding table indicated by said pointer C according to said transmitting MAC address contained in said received frame and, when there is a constructive component of said MAC forwarding table corresponding to said transmitting MAC address, sets said port number of said received frame to said port number of said constructive component and resets the count value of said timer of said constructive component, newly registers said port number in said MAC forwarding table correspondingly to said transmitting MAC address when there is no constructive component, searches said MAC forwarding table indicated by said pointer C using said destination MAC address contained in said frame and, when there is a constructive component of said MAC forwarding table corresponding to said destination MAC address, sends said received frame to said port indicated by said port number of said searched constructive component, and sends said received frame to all of said ports indicated by said port numbers which can communicate by said virtual LAN indicated by the port information in said virtual LAN table having said pointers C indicated by said MAC forwarding table when there is no constructive component.

3. A virtual LAN system as claimed in claim 1, wherein said frame switch removes the constructive component corresponding to said MAC address from said MAC forwarding table, when the count value of said timer of the constructive components of said MAC forwarding table produced correspondingly to said respective transmitting MAC addresses indicative of a transmitter and contained in said frame received by said port exceeds a predetermined value.

4. A virtual LAN system as claimed in claim 3 wherein said virtual LAN system comprises an intelligent switching hub device including a plurality of ports and a frame switch for outputting a frame to one of said ports according to a destination MAC address indicative of said one port as a destination and contained in said frame received by said one of said ports and wherein said frame switch receives said frame at one of said ports, searches said pointer A from said port table according to the number of said port which received said frame, searches said pointer B from said protocol ID table indicated by said pointer A according to a protocol ID indicative of the kind of protocol contained in said received frame and used in said frame communication, extracts said pointer C from said virtual LAN data table indicated by said pointer B, searches said MAC forwarding table indicated by said pointer C according to said transmitting MAC address contained in said received frame and, when there is a constructive component of said MAC forwarding table corresponding to said transmitting MAC address, sets said port number of said received frame to said port number of said constructive component and resets the count value of said timer of said constructive component, newly registers said port number in said MAC forwarding table correspondingly to said transmitting MAC address when there is no constructive component, searches said MAC forwarding table indicated by said pointer C using said destination MAC address contained in said frame and, when there is a constructive component of said MAC forwarding table corresponding to said destination MAC address, sends said received frame to said port indicated by said port number of said searched constructive component, and sends said received frame to all of said ports indicated by said port numbers which can communicate by said virtual LAN indicated by the port information in said virtual LAN table having said pointers C indicated by said MAC forwarding table when there is no constructive component.

5. A virtual LAN system as claimed in claim 1 wherein said ports include physical ports which can be connected physically and logic ports which can be connected logically.

6. A virtual LAN system as claimed in claim 2, wherein said frame switch removes the constructive component corresponding to said MAC address from said MAC forwarding table when the count value of said timer of the constructive components of said MAC forwarding table produced corresponding to said respective transmitting MAC addresses indicative of a transmitter and contained in said frame received by said port exceeds a predetermined value.

7. A virtual LAN system as claimed in claim 2, wherein said ports include physical ports which can be connected physically and logical ports which can be connected logically.

8. A virtual LAN system comprising:

a plurality of virtual LANs;

an intelligent switching hub device with a plurality of ports for conducting protocol-based communications, wherein ports communicating according to one protocol are grouped and communication is performed between said ports in said group, and wherein a virtual LAN is constructed with every protocol according to which said respective ports can perform a communication; and a frame switch for outputting a frame to one of said ports according to a destination MAC address indicative of said one port as a destination and contained in said frame received by said one of said ports, and wherein said frame switch comprises:

a port table having pointers A indicative of next tables corresponding to said respective ports;

a plurality of protocol ID tables produced correspondingly to said pointers A of said respective port tables and having pointers B indicative of respective next tables corresponding in number to protocols which can be communicated with said ports corresponding to said respective pointers A;

a plurality of virtual LAN data tables produced for respective virtual LAN preliminarily determined in said frame switch and having pointers C indicative of respective next tables appointed by said pointers B in said protocol ID tables and a port information indicative of said ports belonging to said respective virtual LANs; and a plurality of MAC forwarding tables produced correspondingly to said respective pointers C in said virtual LAN data tables and having port numbers of said ports corresponding to said respective pointers A and produced corresponding to transmitting MAC addresses contained in said frame received by said ports corresponding to said pointers A in said port tables and indicative of transmitters and a count value of a counter for continuously counting from a time at which said port numbers are registered.

9. The virtual LAN system of claim 3, wherein said ports include physical ports which can be connected physically and logic ports which can be connected logically.

\* \* \* \* \*

UNITED STATES PATENT AND TRADEMARK OFFICE
CERTIFICATE OF CORRECTION

PATENT NO.     : 6,038,608
DATED          : March 14, 2000
INVENTOR(S)    : K. Katsumata It is certified that error appears in the above-identified patent and that said Letters Patent is hereby corrected as shown below:

<u>Title page,</u>
Item [56], References Cited, FOREIGN PATENT DOCUMENTS,
Delete the following:
"63-33945     2/1988     Japan
63-146536    6/1988     Japan
63-193742    8/1988     Japan
64-54954     3/1989     Japan
1-229542     9/1989     Japan
1-254034    10/1989     Japan
3-89645      4/1991     Japan
3-276943    12/1991     Japan
4-341033    11/1992     Japan"

Signed and Sealed this

Twenty-first Day of January, 2003

JAMES E. ROGAN
*Director of the United States Patent and Trademark Office*